(12) United States Patent
Sankey et al.

(10) Patent No.: US 8,586,159 B2
(45) Date of Patent: Nov. 19, 2013

(54) SELF-VENTING POLYMERIC FILM

(75) Inventors: Stephen William Sankey, Great Smeaton (GB); Ken Evans, Yarm (GB); Pierre G. O. Moussalli, Yarm (GB); Stephen Keith Franzyshen, Richmond, VA (US); David Voisin, Midlothian, VA (US)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 523 days.

(21) Appl. No.: 10/564,593

(22) PCT Filed: Jul. 16, 2004

(86) PCT No.: PCT/GB2004/003119
§ 371 (c)(1),
(2), (4) Date: Jan. 13, 2006

(87) PCT Pub. No.: WO2005/007531
PCT Pub. Date: Jan. 27, 2005

(65) Prior Publication Data
US 2006/0165958 A1    Jul. 27, 2006

(30) Foreign Application Priority Data

Jul. 16, 2003 (GB) .................................. 0316708.7

(51) Int. Cl.
*B32B 1/08* (2006.01)
*B32B 3/10* (2006.01)
*B29C 65/48* (2006.01)
*B29C 47/04* (2006.01)
*B65D 81/34* (2006.01)

(52) U.S. Cl.
USPC ............. 428/35.7; 428/138; 156/87; 264/464

(58) Field of Classification Search
USPC ............. 428/35.2, 216, 315.5, 347, 349, 516, 428/35.7, 138; 156/82, 142, 87; 264/173.5, 264/309, 464; 426/113
See application file for complete search history.

(56) References Cited

U.S. PATENT DOCUMENTS 4,172,824 A * 10/1979 Harrington et al. ........... 524/292
4,333,968 A    6/1982 Nahmias
(Continued)

FOREIGN PATENT DOCUMENTS

DE    19710079    9/1998
EP    0178218    4/1986
(Continued)

OTHER PUBLICATIONS http://dictionary.reference.com/browse/laminate 2009.*
(Continued)

*Primary Examiner* — Erik Kashnikow
(74) *Attorney, Agent, or Firm* — RatnerPrestia (57) ABSTRACT

A breathable, heat-sealable, composite film comprising a perforated polymeric substrate layer having a first and second surface and disposed on a surface of the substrate layer an unperforated barrier layer wherein: (i) the thickness of the unperforated barrier layer is no more than about 12 pm; and (ii) the perforated substrate layer has a degree of perforation of from about 0.1 to about 78%, wherein the perforations have an average diameter of between 0.05 and 1.5 mm; and a process for the production thereof, suitable for use in the packaging of freshly cut plants such as flowers, vegetables, fruits and salads.

86 Claims, 1 Drawing Sheet

(56) References Cited

U.S. PATENT DOCUMENTS

| | | | |
|---|---|---|---|
| 4,370,368 A * | 1/1983 | Hirata et al. | 428/36.6 |
| 4,450,250 A * | 5/1984 | McConnell et al. | 524/141 |
| 4,581,087 A | 4/1986 | Johnson | |
| 4,587,175 A * | 5/1986 | Akao | 428/596 |
| 4,640,838 A | 2/1987 | Isakson et al. | |
| 4,661,401 A * | 4/1987 | Akao | 428/215 |
| 4,725,481 A | 2/1988 | Ostapchenko | |
| 4,828,891 A * | 5/1989 | Lustig et al. | 428/35.4 |
| 4,918,156 A * | 4/1990 | Rogers | 528/272 |
| 4,971,847 A * | 11/1990 | Freed | 428/36.7 |
| 5,085,904 A * | 2/1992 | Deak et al. | 428/35.7 |
| 5,114,766 A * | 5/1992 | Jacques | 428/35.7 |
| 5,832,699 A * | 11/1998 | Zobel | 53/461 |
| 5,968,616 A * | 10/1999 | Kakemura et al. | 428/34.2 |
| 6,068,898 A * | 5/2000 | Oyama | 428/35.2 |
| 6,143,818 A * | 11/2000 | Wang et al. | 524/528 |
| 6,261,674 B1 * | 7/2001 | Branham et al. | 428/218 |
| 6,416,832 B1 * | 7/2002 | Uehara et al. | 428/34.8 |
| 6,441,340 B1 * | 8/2002 | Varriano-Marston | 219/121.7 |
| 6,787,630 B1 * | 9/2004 | Dominguez De Walter et al. | 528/279 |
| 2002/0187694 A1 | 12/2002 | Brighton et al. | |
| 2004/0191476 A1 * | 9/2004 | Wallen et al. | 428/138 |

FOREIGN PATENT DOCUMENTS

| | | |
|---|---|---|
| EP | 0358461 | 3/1990 |
| EP | 0563442 | 10/1993 |
| EP | 1086809 A | 3/2001 |
| GB | 838708 | 6/1960 |
| GB | 1472004 | 4/1977 |
| GB | 2024715 | 1/1980 |
| GB | 2250408 | 6/1992 |
| GB | 2280342 | 1/1995 |
| GB | 2355956 | 5/2001 |
| JP | 54-117582 | 9/1979 |
| JP | 6165636 | 6/1994 |
| JP | 6219465 | 8/1994 |
| JP | 8244847 | 9/1996 |
| JP | 2000116706 | 4/2000 |
| JP | 2001158071 | 6/2001 |
| JP | 2002-248698 | 9/2002 |
| JP | 2003-053917 | 2/2003 |
| JP | 2003535723 | 12/2003 |
| JP | 2004509789 | 4/2004 |
| WO | WO01/92000 | 12/2001 |
| WO | WO 02/26493 | 4/2002 |
| WO | WO 02/059186 | 8/2002 |
| WO | WO 03/026892 | 4/2003 |
| WO | WO 03/061957 | 7/2003 |

OTHER PUBLICATIONS

JP07041043A, Dainippon Printing Co. Ltd., Feb. 10, 1995, abstract.
Database WP I, Section Ch, Week 199516, Derwent Publications Ltd., London, GB; AN 1995-118516, XP002311726.

* cited by examiner

SELF-VENTING POLYMERIC FILM

This is a U.S. National Phase of PCT/GB2004/003119 filed Jul. 16, 2004.

This invention relates to a breathable polymeric film, and a process for the production thereof.

Plastic film, particularly polyolefin film, has long been used in the packaging of fresh-cut flowers and vegetables. The primary function of such packaging film is to provide a protective seal against insects, bacteria and air-borne contaminants.

Nevertheless, fresh-cut flowers and vegetables have a limited shelf life due to fundamental changes in their biochemistry. Whilst in soil, photosynthesis allows the plant to grow and expire oxygen. However, after harvesting, the plant no longer converts sunlight and carbon dioxide into carbohydrates and oxygen, but uses its stores of carbohydrate to excrete water and carbon dioxide. For plants that are wrapped in plastic packaging, the accumulation of trapped water in the packaging leads to fungal growths and rotting of the fresh food. A study of volatiles produced by fruits and vegetables has been made by P.M.A. Toivonen ("Non-ethylene, non-respiratory volatiles in harvested fruits and vegetables; their occurrence, biological activity and control", Postharvest Biology and Technology 12 (1997) 109-125). Plastic packaging film, particularly polyolefin film, acts as a water barrier and can actually make this situation worse by trapping excreted water within the package. Vegetables having a high moisture content, such as broccoli and mushrooms, are particularly susceptible. It would be desirable to provide packaging which not only provides a bather to insects, bacteria and air-borne contaminants but which is also breathable to water (in other words, a film which would allow water to freely pass out of the packaging), thereby increasing the shelf life of the contents by delaying the onset of microbial and fungal growth.

There already exist a number of commercially available breathable films. Several companies market polyolefin films which have been voided using inorganic fillers thereby allowing easier passage of water. However, such films are not normally transparent and therefore have a disadvantage from a marketing standpoint. Other commercially available films based on thermoplastic elastomers (TPEs) provide excellent breathability but are expensive for packaging applications.

Another approach to the manufacture of breathable packaging has been to perforate the film in order to allow egress of excreted gas. The number of perforations per unit area and the perforation diameter may be adjusted depending on the goods to be packaged and the respiration rate thereof. A film suitable for bread packaging may, for instance, be perforated over its whole surface area with perforations of about 700 microns in diameter. The packaging for goods such as vegetables usually involves a smaller perforation diameter, typically between about 100 to 300 microns, and with fewer perforations per unit area. The disadvantage of this approach is that the perforations expose the packaged goods to insects, bacteria and air-borne contaminants. A further disadvantage, especially for perforated film which has a "tailored" number of holes to allow for gas transmission, is that the water vapour transmission rate of the packaging is not greatly affected by the perforations. WO-01/92000-A discloses an air-permeable composite film comprising a perforated substrate layer and a sealing layer in which the material of the sealing layer fills the gaps in the substrate layer, wherein in use as packaging for a microwaveable meal the differential pressure between the two sides of the composite film causes reversible enlargement of the gaps, which act as valves, allowing air-permeability in a composite film which would otherwise be impermeable. GB-2355956-A discloses a composite film comprising a gas-permeable polyolefin barrier and a sealable layer, which may be perforated or in the form of a mesh or net, and which is stated as suitable for packaging fresh-cut fruit vegetables. Other optionally heat-sealable composite films comprising a perforated layer are disclosed in EP-0358461-A; EP-0178218-A; US-2002/0187694-A1; JP-A-06/219465-A; JP-06/165636-A; JP-54/117582-A.

It is an object of this invention to provide a breathable, heat-sealable packaging film which allows egress of moisture and excreted gas, particularly moisture, from the packaged product but which provides a physical barrier to insects, bacteria and airborne contaminants, particularly wherein the film is optically clear.

According to the present invention, there is provided a breathable, heat-sealable, composite film comprising a perforated polymeric substrate layer having a first and second surface and disposed on a surface of the substrate layer an unperforated barrier layer wherein:

(i) the thickness of the unperforated barrier layer is no more than 12 μm, preferably no more than 8 μm; and
(ii) the perforated substrate layer has a degree of perforation of from about 0.1 to about 78%, wherein the perforations have an average diameter of from 0.05 to about 1.5 mm.

In a first embodiment, the substrate layer is itself a heat-sealable layer. In this embodiment, the barrier layer is normally disposed on the first surface of the substrate.

In a second embodiment, the composite film comprises a discrete heat-sealable layer disposed on the second surface of the substrate. In this embodiment, the heat-sealable layer also contains perforations such that the locations of the perforations of the heat-sealable layer correspond to those of the substrate layer and, in practice, the perforations in the heat-sealable and substrate layers are effected at the same time. In this embodiment, the barrier layer is normally disposed on the first surface of the substrate.

In a third embodiment, the heat-sealable functionality is provided by the barrier layer, which is disposed on the second surface of the substrate. In this embodiment, the substrate layer need not be, and preferably is not, a heat-sealable layer. In this embodiment, there need not be, and preferably is not, an additional heat-sealable layer present.

In one embodiment of the present invention, the unperforated barrier layer is preferably disposed on the first surface of the substrate layer and is preferably selected from a polyester, polyolefin or copolyesterether layer. In this embodiment, preferably the perforations have an average diameter of between 0.1 and 1.5 mm.

Preferably, the composite film has a water vapour transmission rate (WVTR) of at least 60 g/m$^2$/day, preferably at least 80 g/m$^2$/day, preferably at least 90 g/m$^2$/day, preferably at least 100 g/m$^2$/day, preferably at least 115 g/m$^2$/day, preferably at least 130 g/m$^2$/day, preferably at least 140 g/m$^2$/day, and more preferably at least 150 g/m$^2$/day.

Preferably, the film has an oxygen transmission rate from about 150 to about 50,000 cm$^3$/m$^2$/day, preferably from about 3000 to about 20,000 cm$^3$/m$^2$/day, preferably from about 5000 to about 15,000 cm$^3$/m$^2$/day.

The term "degree of perforation" as used herein refers to the hole fraction of the total surface area expressed as a percentage, i.e. it is the total area of the perforations as a percentage of the total film surface area. Preferably, the degree of perforation is at least 5%, preferably at least 10%, preferably at least 15%, and more preferably at least 20%.

Preferably the degree of perforation is from about 1 to about 50%, more preferably from about 1 to about 30%.

Preferably the average perforation diameter is between 0.3 and 1.0 mm, more preferably between about 0.3 and 0.7, and more preferably between 0.3 and 0.6 mm. In one embodiment, the average perforation diameter is between about 0.1 and 1.5 mm. (For the avoidance of doubt, the term "between" when referring to a range also includes the end-points of that range.) Preferably, there are from about 25 to about 400 perforations per $(25 \text{ mm})^2$ (i.e. over a square measuring 25 mm×25 mm), more preferably from about 100 to about 360 perforations per $(25 \text{ mm})^2$, more preferably from about 150 to 360 perforations per $(25 \text{ mm})^2$, and more preferably from about 250 to about 360 perforations per $(25 \text{ mm})^2$.

The degree of perforation and the perforation diameter may be adjusted depending on the goods to be packaged and the respiration rate thereof.

The substrate is a self-supporting film or sheet by which is meant a film or sheet capable of independent existence in the absence of a supporting base. The substrate may be formed from any suitable film-forming material. Thermoplastic polymeric materials are preferred. Such materials include a homopolymer or copolymer of a 1-olefin, such as ethylene, propylene and but-1-ene, a polyamide, a polycarbonate, PVC, PVA, polyacrylates, celluloses and a polyester. Polyolefins and polyesters, particularly linear polyesters, are preferred. If the composite film does not comprise an additional heat-sealable layer, the substrate is itself heat-sealable. The substrate is preferably uniaxially or biaxially oriented, preferably biaxially oriented.

Thermoset resin polymeric materials suitable for use as the substrate include addition-polymerisation resins, such as acrylics, vinyls, bis-maleimides and unsaturated polyesters; formaldehyde condensate resins, such as condensates with urea, melamine or phenols, cyanate resins, functionalised polyesters, polyamides or polyimides.

Suitable polyesters include those derived from one or more dicarboxylic acids, such as terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid), and from one or more glycols, particularly an aliphatic or cycloaliphatic glycol, such as ethylene glycol, 1,3-propanediol, 1,4-butanediol, neopentyl glycol and 1,4-cyclohexanedimethanol. An aliphatic glycol is preferred.

A preferred substrate polyester is selected from polyethylene terephthalate and polyethylene naphthalate. Polyethylene terephthalate (PET) or a copolyester thereof is particularly preferred.

A preferred polyolefin substrate comprises polyethylene or polypropylene, preferably polypropylene.

In the embodiment wherein the substrate is itself heat-sealable, hereinafter referred to as Embodiment A, the substrate comprises a heat-sealable polyolefin (preferably a polypropylene) or a heat-sealable polyester.

In the embodiment wherein the composite film comprises an additional heat-sealable layer, hereinafter referred to as Embodiment B, the substrate preferably comprises a polyester. In Embodiment B, the heat-sealable layer is any layer capable of forming a heat-seal bond to the surfaces of the container, for example a polymeric material such as a polyester, ethylene vinyl alcohol (EVA) or a modified polyethylene. The polymer material of the heat-sealable layer should soften to a sufficient extent that its viscosity becomes low enough to allow adequate wetting for it to adhere to the surface to which it is being bonded. In one embodiment, the heat-sealing layer comprises a polyester, particularly a copolyester derived from one or more of the dicarboxylic acid(s) or their lower alkyl diesters with one or more of the glycol(s) referred to herein.

In one embodiment, hereinafter referred to as Embodiment B1, the additional heat-sealable layer comprises a copolyester derived from an aliphatic glycol and at least two dicarboxylic acids, particularly aromatic dicarboxylic acids, preferably terephthalic acid and isophthalic acid. A preferred copolyester is derived from ethylene glycol, terephthalic acid and isophthalic acid. The preferred molar ratios of the terephthalic acid component to the isophthalic acid component are in the range of from 50:50 to 90:10, preferably in the range from 65:35 to 85:15. In a preferred embodiment, this copolyester is a copolyester of ethylene glycol with about 82 mole % terephthalate and about 18 mole % isophthalate.

In an alternative embodiment, hereinafter referred to as Embodiment B2, the additional heat-sealable layer comprises a copolyester derived from an aliphatic diol and a cycloaliphatic diol with one or more, preferably one, dicarboxylic acid(s), preferably an aromatic dicarboxylic acid. Examples include copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. In a preferred embodiment this copolyester is a copolyester of terephthalic acid with about 33 mole % 1,4-cyclohexane dimethanol and about 67 mole % ethylene glycol. An example of such a polymer is PETG™6763 (Eastman) which comprises a copolyester of terephthalic acid, about 33% 1,4-cyclohexane dimethanol and about 67% ethylene glycol and which is always amorphous. In an alternative embodiment of the invention, the polymer of layer B may comprise butane diol in place of ethylene glycol.

In a further alternative embodiment, hereinafter referred to as Embodiment B3, the additional heat-sealable layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the copolyester is preferably in the range from 45 to 80, more preferably 50 to 70, and particularly 55 to 65 mole % based on the dicarboxylic acid components of the copolyester. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters are (i) copolyesters of azeleic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol (preferably having the components in the relative molar ratios of 45-55/55-45/100, more preferably 50/50/100) having a glass transition point ($T_g$) of −40° C. and a melting point ($T_m$) of 117° C.), and a copolyester of azeleic acid/terephthalic acid/ethylene glycol (preferably having the components in the relative molar ratios of 40-50/60-50/100, more preferably 45/55/100) having a $T_g$ of −15° C. and a $T_m$ of 150° C.

In a further alternative embodiment, hereinafter referred to as Embodiment B4, the additional heat-sealable layer comprises an ethylene vinyl acetate (EVA). Suitable EVA polymers may be obtained from DuPont as Elvax™ resins. Typically, these resins have a vinyl acetate content in the range of 9% to 40%, and typically 15% to 30%.

The thickness of an additional heat-sealable layer is generally between about 1 and 30% of the thickness of the substrate. Typically, an additional heat-sealable layer may have a thickness of up to about 25 µm, more preferably up to about 15 µm, more preferably up to about 10 µm, more preferably between about 0.5 and 6 µm, and more preferably between about 0.5 and 4 µm.

In the embodiment wherein the heat-sealable functionality is provided by the barrier layer, hereinafter referred to as Embodiment C, the substrate may comprise any of the polymeric substrates referred to above, including a polyolefin (preferably a polypropylene) or a polyester, and preferably comprises a polyester (preferably PET).

Preferably, the composite film exhibits a heat-seal strength to itself of at least 300 g/25 mm, preferably from about 400 g/25 mm to about 1000 g/25 mm, and more preferably from about 500 to about 850 g/25 mm.

Formation of the substrate may be effected by conventional techniques well-known in the art. Conveniently, formation of the substrate is effected by extrusion, in accordance with the procedure described below. In general terms the process comprises the steps of extruding a layer of molten polymer, quenching the extrudate and orienting the quenched extrudate in at least one direction.

The substrate may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process.

In the preferred flat film process, the substrate-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film but should not be selected so as to substantially degrade the tear resistant properties of the film. Within these constraints, a heat set temperature of about 135° to 250° C. is generally desirable, as described in GB-A-838708.

Formation of an additional heat-sealable layer may be effected by conventional techniques. The method of formation of the heat-sealable layer and application thereof to the substrate will depend on the identity of the heat-sealable layer. Conventional techniques include casting the heat-sealable layer onto a preformed substrate layer. Conveniently, formation of an additional heat-sealable layer and the substrate is effected by coextrusion, which would be suitable for Embodiments B1 and B2 above. Other methods of forming the heat-sealable layer include coating the heat-sealable polymer onto the substrate, and this technique would be suitable for Embodiments B3 and B4 above. Coating may be effected using any suitable coating technique, including gravure roll coating, reverse roll coating, dip coating, bead coating, extrusion-coating, melt-coating or electrostatic spray coating. Coating may be conducted "off-line", i.e. after any stretching and subsequent heat-setting employed during manufacture of the substrate, or "in-line", i.e. wherein the coating step takes place before, during or between any stretching operation(s) employed. Preferably, coating is performed in-line, and preferably between the forward and sideways stretches of a biaxial stretching operation ("inter-draw" coating). Examples of the coating of heat-sealable layers include: GB-2024715 and GB-1077813 which disclose the inter-draw extrusion-coating of polyolefin onto substrates of polyolefin and polyester respectively; U.S. Pat. No. 4,333,968 which discloses the inter-draw extrusion-coating of an ethylene-vinyl acetate copolymer onto a polypropylene substrate; and WO-02/59186 which discloses the coating of copolyester, and the disclosures of these documents are incorporated herein by reference.

Prior to application of an additional heat-sealable layer onto the substrate, the exposed surface of the substrate may, if desired, be subjected to a chemical or physical surface-modifying treatment to improve the bond between that surface and the subsequently applied layer. For example, the exposed surface of the substrate may be subjected to a high voltage electrical stress accompanied by corona discharge. Alternatively, the substrate may be pretreated with an agent known in the art to have a solvent or swelling action on the substrate, such as a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The substrate is suitably of a thickness between about 5 and 350 µm, preferably from 9 to about 150 µm and particularly from about 12 to about 40 µm.

Perforation of the substrate and, if present, the additional heat-sealable layer may be effected using an Intermittent Hot Needle Perforator (PX9 series; BPM Engineering Services Ltd, Rochdale, UK). The lower diameter limit for perforations made in this way is generally about 0.1 mm. Perforations may also be effected by a laser beam (for example a $CO_2$ laser) in which case, perforations of smaller diameter can be made, typically down to about 0.05 mm. Perforations are typically made in one or more lines across the substrate. Any suitable arrangement for the hole pattern may be adopted. For instance, the holes may be arranged in a cubic close-packed arrangement or a hexagonal close-packed arrangement. Preferably all perforations have the same or substantially the same diameter.

In the use of the film described herein as a packaging film, the function of the barrier layer is to provide a physical barrier to entry of external contaminants, such as insects, bacteria and air-borne contaminants, which would spoil the substance contained within the packaging during transport and storage. The barrier layer is adapted to allow egress of water vapour, i.e. to allow the packaging to be breathable.

As described above, the barrier layer is normally disposed on the first surface of the substrate, such as in Embodiments A and B above, and forms the outermost layer of the packaging. Alternatively, the barrier layer may also function as a heat-sealable layer, as described above in Embodiment C, and is disposed on the second surface of the substrate, which forms the innermost layer of the packaging.

Preferably, the barrier layer extends over the whole surface of the substrate. In one embodiment, however, the barrier layer does not extend across the whole surface of the substrate, for instance in cases where the substrate comprise perforations only in one or more discrete regions. In that embodiment, the barrier layer need only be applied onto the substrate in those discrete regions. Thus, the barrier layer may be coated as one or more strips across the width or length of the film in regions which cover the line(s) of perforations.

The barrier layer forms a discrete layer on at least part of the surface of the substrate and is disposed over the perforations, i.e. the barrier layer does not substantially extend into or fill the perforations. As used herein, the term "substantially extend into or fill the perforations" means that the material of the barrier layer occupies no more than 50%, preferably no more than 40%, preferably no more than 30%, preferably no more than 20%, preferably no more than 10%, preferably no more than 5%, and preferably 0% of the volume of a perforation, the volume of a perforation being defined as the volume of a void formed in the substrate layer by a perforation.

The unperforated layer may be selected from a variety of film-forming polymeric materials provided that the materials are gas-permeable, particularly to water vapour and preferably also to oxygen. Thus, the material of the barrier layer is gas permeable and in use retains continuity and/or coverage over the perforations in the substrate. Thus, in use the barrier properties (for instance to bacteria, air-borne contaminants and insects) are retained. The film-forming materials are typically insoluble or substantially insoluble in water. Solubility is measured as the fraction of the barrier layer dissolved when the film is immersed in deionised water at 80° C. for 2 minutes. Thus, in the case of a completely water insoluble barrier layer, the mass fraction of layer dissolved is 0. It is preferred that the mass fraction of barrier layer dissolved is no more than 0.2, preferably no more than 0.1, preferably no more than 0.05, preferably no more than 0.01, and preferably 0.

Suitable polymeric materials are selected from polyesters; copolyesterethers; polyolefins; styrenic thermoplastic elastomers (including styrene-butadiene-styrene (SBS), styrene-isoprene-styrene (SIS), styrene-ethylene-butylene-styrene (SEBS) and styrene-ethylene-propylene-styrene (SEPS)); copolyamideethers (particularly polyether block amides); polyamides (including nylon 4, 6, 6/6, 6/10, 6/12, 11 and 12); cellulosic plastics (including cellulose and cellulose derivatives such as cellulose acetate and cellulose propionate); polycaprolactone; and polyurethane (including Estane).

In one embodiment, the polymeric material of the unperforated layer is selected from polyesters; copolyesterethers; styrenic thermoplastic elastomers (including styrene-butadiene-styrene (SBS), styrene-isoprene-styrene (SIS), styrene-ethylene-butylene-styrene (SEBS) and styrene-ethylene-propylene-styrene (SEPS)); copolyamideethers (particularly polyether block amides); polyamides (including nylon 4, 6, 6/6, 6/10, 6/12, 11 and 12); cellulosic plastics (including cellulose and cellulose derivatives such as cellulose acetate and cellulose propionate); polycaprolactone; and polyurethane (including Estane).

In a further embodiment, the unperforated layer is selected from a polyester, copolyesterether and a polyolefin, preferably a polyester or copolyetherester.

An unperforated polyester layer is preferably a synthetic linear polyester selected from those mentioned herein above, particularly a polyester derived from one dicarboxylic acid, preferably an aromatic dicarboxylic acid, preferably terephthalic acid or naphthalenedicarboxylic acid, more preferably terephthalic acid, and one glycol, particularly an aliphatic or cycloaliphatic glycol, preferably ethylene glycol. Preferably, the unperforated polyester layer comprises PET.

An unperforated polyolefin layer may be selected from, for instance, polyethylene, polystyrene (including oriented polystyrene) or polypropylene (including oriented polypropylene).

An unperforated copolyesterether layer may comprise, for instance, a copolyesterether as described in U.S. Pat. No. 4,725,481, the disclosure of which copolyesterethers is incorporated herein by reference.

In a preferred embodiment, the copolyetherester elastomer(s) have a multiplicity of recurring long-chain ester units and short-chain ester units joined head-to-tail through ester linkages, said long-chain ester units being represented by the formula:

and said short-chain ester units being represented by the formula:

wherein

G is a divalent radical remaining after the removal of terminal hydroxyl groups from a poly(alkylene oxide)glycol having an average molecular weight of about 400 to 4000, preferably, about 400 to 3500, wherein the amount of ethylene oxide groups incorporated in said one or more copolyetheresters by the poly(alkylene oxide)glycol is from about 20 to about 68 weight percent, preferably from about 25 to about 68 weight percent, based upon the total weight of the copolyetherester(s);

R is a divalent radical remaining after removal of carboxyl groups from a dicarboxylic acid having a molecular weight less than about 300;

D is a divalent radical remaining after removal of hydroxyl groups from a diol having a molecular weight less than about 250;

wherein said colpolyetherester(s) contain from about 25 to about 80 weight percent short-chain ester units.

The thickness of the unperforated barrier layer is no more than 12 μm, preferably no more than 8 μm. Typically, the thickness is 0.05 μm or greater, preferably 0.1 μm or greater, and preferably 0.5 μm or greater. In one embodiment, particularly when the unperforated layer is adhesively-laminated to the substrate layer, the thickness of the unperforated layer is no more than about 8 and preferably no more than about 5 μm, and can be as thin as no more than about 3 μm, or no more than 1.5 μm, or even no more than 1.0 μm. In a further embodiment, particularly when the unperforated layer is coated (particularly extrusion coated) onto the substrate layer, the thickness of the unperforated layer is in the range of 6 to 12 μm, preferably 8 to 12 μm.

The composite film comprising the perforated and unperforated layers may be formed by any suitable technique, for instance by coating or lamination of the unperforated barrier layer onto the substrate (or onto the substrate and heat-sealable layer composite). The coating or lamination step may be performed according to conventional techniques well-known in the art. The coating step may, for example, be conducted using gravure coating (direct or indirect), slot-die coating, extrusion coating or melt coating techniques. The viscosity of the coating liquid at the point of application to the substrate must not be too high otherwise the polymer will not flow properly, resulting in difficulties in coating and uneven coat thicknesses, but should not be too low that the coating liquid passes through the perforations in the substrate layer. Preferably, the viscosity of the coating liquid is at least 0.05 Pa·s.

Slot-die coating and gravure coating are well-known in the art, and are particularly applicable when the viscosity of the coating liquid is from about 0.05 to about 5 Pa·s, with gravure coating being more suitable at the lower end of this range, and slot-die coating being more suitable at the higher end of this range.

Extrusion-coating is described by K. A. Mainstone in Modern Plastics Encyclopedia, 1983-84, Vol. 60, No. 10A, Edition 1, pp 195-198 (McGraw-Hill, N.Y.) and also by Franz Durst and Hans-Günte Wagner in Liquid Film Coating (Chapman and Hall; 1997; Eds S. F. Kistler and P. M. Schweizer; Chapter 11a). The extrusion-coating process is generally used for polymers of medium or high viscosity (at least 50 Pa·s and up to about 5000 Pa·s) and generally employs an air-gap (typically about 15 cm) between the die and the substrate. The coated substrate is passed between a heat-removing chill roller and a pressure-loaded resiliently-covered nip-roll. Typically, an extrusion-coating process is performed at a temperature of at least 200° C. and often higher.

Melt-coating, also known as hot melt-coating or slot-coating, is described by Durst and Wagner (ibid). The coating is generally conducted at a temperature of about 260° C. or below (typically 200 to 260° C., particularly 220 to 250° C., and more particularly 230 to 250° C.). Melt-coating equipment typically comprises a melter, coupled to a die via an insulated flexible hose. The melter consists of a hopper having heating elements at its base, which heat the polymer/adhesive to a molten state. The hopper is fed continuously by conventional means so that the melter is always "topped up", thereby minimising air ingress to the molten polymer to reduce oxidation of the molten polymer. The molten polymer is then pumped through the hose to a traditional "coathanger" die. In the traditional melt-coating process, the substrate web is pressed up against the die by a roller such that there is no air gap between the die and substrate. The roller is generally a rubber-backing roller which provides sufficient back-pressure to the die to provide an even coating layer. Preferably the viscosity of the coating layer polymer at the processing temperature is no more than about 50 Pa·s and preferably at least about 20 Pa·s.

A lamination process should be conducted such that the important characteristics of the film are retained. If the adhesive layer is too thick, it may form a barrier to the passage of water vapour through the film and the perforations may become blocked, resulting in a lower WVTR. Accordingly, a lamination step should use only a minimum of adhesive. The composite film of the present invention requires only a low delamination resistance for suitability in its primary intended application, i.e. breathable packaging film. Typically, the delamination bond strength of the composite film is no more than 300 g/25 mm, preferably from about 100 g/25 mm to about 300 g/25 mm, and more preferably from about 150 to about 300 g/25 mm. Preferably, therefore, the adhesive is applied at a coat weight of no more than 2.0 g/m², preferably no more than 0.5 g/m², and preferably no more than 1.0 g/m².

In a preferred embodiment, the adhesive comprises an EVA, and is preferably a fast-setting adhesive, for instance BAM301 (Beardow and Adams Ltd, Milton Keynes, UK), which has a typical setting time of between 1 and 2 seconds.

In a preferred embodiment, the adhesive is applied to the unperforated film or the perforated substrate, preferably the unperforated film, using a conventional spray melt-coating technique. Spray melt-coating equipment (Dynafibre™) is obtainable from Mercers Ltd (Rugby, UK; a licensee of ITW Dynatech Inc, USA).

Lamination is then conveniently effected by passing the coated, unperforated film and the perforated substrate through a heated nip-roller to obtain the final composite film. Other methods and equipment suitable for effecting lamination will be apparent to the skilled person.

Prior to application of the adhesive and lamination, the exposed surface of the perforated and unperforated layers of the composite film may, if desired, be subjected to a chemical or physical surface-modifying treatment as described hereinabove.

The unperforated layer may itself be uniaxially or biaxially oriented, as described herein. It will be understood that where a lamination technique is used to make the composite film, the self-supporting unperforated film may be manufactured by the film production methods described generally herein.

According to a further aspect of the present invention, there is provided a process for producing a breathable, heat-sealable composite film comprising:
(a) providing a polymeric substrate layer having a first and second surface and optionally a discrete heat-sealable layer disposed on the second surface of the substrate;
(b) perforating said substrate and if present said discrete heat-sealable layer; and
(c) providing an unperforated barrier layer on a surface of the substrate, preferably the first surface,
wherein
(i) the thickness of the unperforated layer is no more than 12 μm, preferably no more than 8 μm; and
(ii) the perforated substrate layer has a degree of perforation of from about 0.1 to about 78%, wherein the perforations have an average diameter of between 0.05 and 1.5 mm.

In one embodiment, the process comprises laminating the unperforated layer onto the substrate wherein the lamination step comprises the steps of spray melt-coating an adhesive onto the unperforated film or the perforated substrate, preferably the unperforated film, and contacting the unperforated and perforated layer to effect lamination.

One or more of the layers of the polymeric film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular the composite film may comprise a particulate filler which may, for example, be a particulate inorganic filler or an incompatible resin filler or a mixture of two or more such fillers. Such fillers are well-known in the art.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polymer layer. Preferred particulate inorganic fillers include titanium dioxide and silica.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 μm, more preferably 0.05 to 1.5 μm, and particularly 0.15 to 1.2 μm. Preferably at least 90%, more preferably at least 95% by volume of the inorganic filler particles are within the range of the volume distributed median particle diameter±0.8 μm, and particularly ±0.5 μm. Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In the preferred embodiment, the film of the present invention is optically clear, preferably having a % of scattered visible light (haze) of <10%, preferably <6%, more preferably <3.5% and particularly <2%, measured according to the standard ASTM D 1003. Preferably, the total light transmission (TLT) in the range of 400-800 nm is at least 75%, preferably at least 80%, and more preferably at least 85%, measured according to the standard ASTM D 1003. In this embodiment, filler is typically present in only small amounts, generally not exceeding 0.5% and preferably less than 0.2% by weight of the polymer of a given layer.

The primary use of the film of the present invention is as a breathable film for packaging freshly cut plants such as flowers, vegetables, fruit and salads. The film may make up all or substantially all of the packaging for such products, or may comprise only part of the total packaging. For instance, the film may form a heat-sealed lid onto a receptacle in or on which the goods are disposed. The receptacle may be a tray such as a thermoformed tray or bowl, and may, for instance be formed of polyester, such as polyethylene terephthalate, or of polypropylene, polystyrene, or may be PVDC-coated. A film according to the invention is particularly suitable for use as a lid on a receptacle made from, for instance, polyester, polystyrene or polypropylene. Sealing of the receptacle is effected by techniques well-known to those skilled in the art. Once the contents to be packaged have been introduced into the receptacle, the heat-sealable film lid is placed upon the receptacle such that the heat-sealable layer of the film is in contact with the receptacle, and is affixed using temperature and/or pressure using conventional techniques and equipment. In an alternative embodiment, the film is heat-sealed to itself to form substantially all of the packaging.

In an alternative embodiment, the film is heat-sealed to itself to form substantially all of the packaging. In this embodiment, the seal is provided by heat-sealing a first portion of the film to a second portion of the film. Such seals are effected by conventional techniques and include "fin seals" and "overlap seals", preferably fin seals. Once the product is placed within the film, the two portions of the film which are to be bonded together are brought together with the heat sealable surface of one film portion being in contact with the heat sealable surface of the other film portion, and the heat-seal bond formed by the application of temperature and optionally pressure using conventional equipment. The heat-seal bond may be formed at temperatures in the range of about 110 to about 150° C.

The first surface of the substrate is the surface which is outermost when the film is used as such packaging, the second surface being the surface which is innermost and faces the goods to be packaged.

In a further aspect, the present invention provides the use of a film as described herein as a breathable film in the packaging of cut plant(s), for instance flowers or foodstuffs (including vegetables, fruits and salads), particularly wherein said packaging comprises the film as a lidding film and further comprises a receptacle.

In a further aspect, the invention provides a sealed container comprising a receptacle containing cut plant(s), for instance flowers or foodstuffs (including vegetables, fruits and salads), and a lid formed from a polymeric film as defined herein.

In a further aspect, the invention provides a packaged, sealed product comprising cut plant(s), for instance flowers or foodstuffs (including vegetables, fruits and salads), wherein the packaging which effects and forms the seal around the food product is a composite film as defined herein which is heat-sealed to itself.

The polymeric film of the present invention may also be used for packaging convenience foods, for example ready-prepared meals which are warmed either in a microwave or a conventional oven. The film may make up all or substantially all of the packaging for such products, or may comprise only part of the total packaging. For instance, the film may form a heat-sealed lid onto a receptacle in or on which the food is disposed. During the cooking cycle, water vapour is driven from the food. The breathable film of the present invention allows the steam produced during the cooking cycle to be vented from the container (the term "container" referring to the sealed lid and receptacle). This avoids the build-up of pressure within the container and the risk of rupture of the film lid, which can cause fragments of the film lid to contaminate the contents of the container. Conventional film lids for ovenable ready-prepared food containers generally required that the user pierce the lid to prevent this. However, the need for piercing the lid prior to warming the food in its container is often forgotten or not understood by the user. Previous self-venting films which address these problems include those disclosed in WO-02/26493-A; WO-03/026892-A; and WO-03/061957-A. The self-venting breathable films of the present invention are also advantageous in that they promote uniform heating over the whole volume of the foodstuff, which can be a problem with existing lids for these types of applications. The receptacle may be an APET/CPET tray (a composite material having an amorphous polyethylene terephthalate layer on top of a crystalline polyethylene terephthalate layer). Other suitable types of receptacle include a foil tray (particularly an aluminium foil tray), a metallised tray and a tray formed from PET-coated cartonboard or paperboard. Of particular utility are trays formed from metallised (particularly flash-metallised) PET cartonboard. For example, the tray may be produced from PET which has been metallised to an optical density in the range of about 0.01 to 4.0 and which is laminated to cartonboard. In one embodiment, the tray is a susceptor tray made from materials such as those disclosed in GB-A-2280342, EP-A-0563442 or GB-A-2250408, or is a susceptor tray produced in accordance with the disclosures of these documents, which are incorporated herein by reference. Desirably, the heat-seal strength when sealed to a standard APET/CPET tray is in the range of 300 to 1800 g/25 mm, measured as described herein. It is preferred that the heat seal strength is at least 400, preferably at least 600, preferably at least 700 and more preferably at least 800 g/25 mm when sealed to a standard APET/CPET tray. Preferably, the heat-seal strength of the coated film to APET/CPET trays is in the range of 800-1500 g/25 mm, preferably 800-1200 g/25 mm. Sealing of the film to the receptacle is effected by the techniques described herein.

In a further aspect, the present invention provides the use of a film as described herein as packaging for an ovenable meal, particularly as a lid in the packaging of an ovenable meal wherein said packaging further comprises a receptacle.

In a further aspect, the present invention provides the use of a film as described herein as a self-venting film in the packaging of an ovenable meal, particularly as a self-venting lid in the packaging of an ovenable meal wherein said packaging further comprises a receptacle.

In a further aspect, the present invention provides a packaged ovenable meal, wherein the packaging comprises a film as defined herein, particularly wherein said packaging comprises the film of the present invention as a self-venting lid and further comprises a receptacle.

The following test methods may be used to characterise the polymeric film:
(i) Clarity of the film may be evaluated by measuring total light transmission (TLT) and haze (% of scattered transmitted visible light) through the total thickness of the film using a Gardner XL 211 hazemeter in accordance with ASTM D-1003-61.
(ii) Heat-seal strength of the heat-sealable layer to itself is measured by positioning together and heating the heat-sealable layers of two samples of polyester film at 140° C. for one second under a pressure of 275 kPa (40 psi). The sealed film is cooled to room temperature, and the sealed composite cut into 25 mm wide strips. The heat-seal strength is determined by measuring the force required under linear tension per unit width of seal to peel the layers of the film apart at a constant speed of 4.23 mm/second.
(iii) Heat-seal strength to a standard APET/CPET tray is measured by the following procedure. The coated film was sealed, by means of the coating layer, to a standard APET/CPET tray using a Microseal PA 201 (Packaging Automation Ltd, England) tray sealer at a temperature of 180° C., and pressure of 80 psi for one second. Strips (25 mm) of the sealed film and tray were cut out at 90° to the seal, and the load required to pull the seal apart was measured using an Instron Model 4301 operating at a crosshead speed of 0.2 mmin$^{-1}$. The procedure was repeated and a mean value of 5 results calculated.
(iv) Delamination Bond Strength was measured by the following procedure. Using a straight edge and a calibrated sample cutter (25 mm+\−0.5 mm) five strips of laminate of minimum length 100 mm were cut. Peel between the laminated layers was initiated at one end of each sample and the laminates peeled apart over a distance of approximately 40 mm in length. Each sample in turn was tested using an Instron model 4464 materials test machine, using pneumatic action grips with rubber jaw faces. Crosshead speed was 50 mm\min$^{-1}$. The samples were inserted into the Instron jaws with one layer clamped in the fixed jaws and the other half in the moving jaws ensuring that an equal amount of each layer was held in each jaw to allow the laminate to be pulled apart evenly. The equipment recorded the mean peel strength of each sample between 10 mm and 50 mm and the bond strength of the laminate was quoted as an average of 5 samples in g\25 mm.
(v) Water vapour transmission rates were measured using a Lyssy Water Vapour Permeation Tester model number L80 400J. Test samples were prepared by cutting around a template (100×110 mm). Once cut to size samples were sealed into a standard Lyssy sample holder card by placing in a hydraulic press for approximately 5 minutes at a pressure of 2 tonnes.

Prior to testing the equipment was calibrated using standard 19 micron and 36 micron PET film (Melinex® S; DuPont Teijin Films; m.p. 248° C.; relative density at 23° C. of 1.40). In order to keep the conditioning and measuring chambers apart an impermeable foil laminate was used in between testing of samples. During sample changeover the test specimen and the foil layer were placed on top of each other to ensure that at no time the measuring chamber was directly exposed to the conditioning chamber.

Testing was carried out at a temperature of 38° C. and at 90% relative humidity. Equilibrium was reached when consecutive results change by less than 2% indicated by an asterisk on the equipment printout. Water vapour transmission rate quoted in g/m$^2$/day is recorded when 5 consecutive asterisks were seen on the printout.
(vi) Oxygen Transmission Rates were determined using conventional techniques in a Mocon 1050 (Modem Controls Inc.) test instrument. A sample of the film was placed in the machine with the nitrogen carrier gas (containing 1% hydrogen) flowing both above and below the sheet, in order that a background reading can be obtained. The nitrogen above the sheet was replaced by oxygen, and the amount of oxygen able to permeate through the sheet was measured in a carrier gas by using a sensor.
(vii) Solubility of the barrier layer is measured as the fraction of layer dissolved when the film is immersed in deionised water at 80° C. for 2 minutes. Thus, in the case of a completely water insoluble barrier layer, the fraction of layer dissolved is 0. The procedure is as follows. A film sample (200 cm$^2$) is weighed and then immersed in 1-liter of deionised water at 80° C. for 2 minutes, with stirring. The film sample is then dried at 120° C. for 10 minutes in an oven. The weight of the treated film sample is then measured. The weight of the barrier layer fraction can then be calculated, since the weight of the coated film prior to treatment is known.

(viii) Self-venting is measured as the time (in seconds) required for the film to fail on at least on side of a tray. This time can be referred to as the bursting time. The film is heat-sealed at 150° C. for 1 second under 5.5 bar, to a polypropylene tray (area: 16.5 cm×12.5 cm, depth: 3.5 cm) containing 50 cm$^3$ of deionised water. The sealed tray is then put in a microwave oven at power 900W, set up for 10 minutes. A film with a 1 cm diameter hole does not fail for 10 minutes, while a film heat-sealed to a PP tray without any perforations blows after 40-50 seconds.

The invention is illustrated by reference to FIGS. 1 and 2 wherein.

Figure 1:
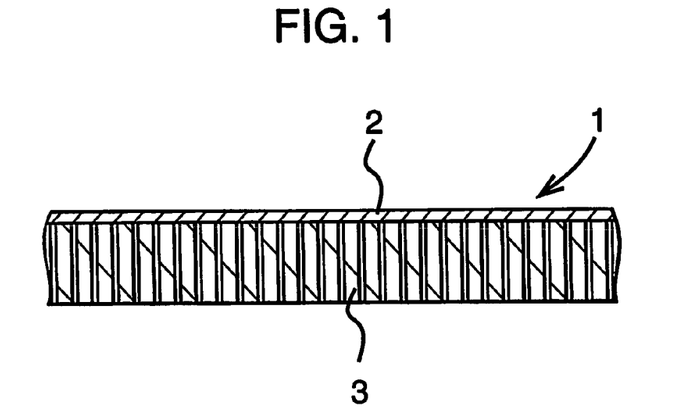
FIG. 1 shows a breathable film (1) having an unperforated polyester layer (2) and a perforated substrate layer (3).
Figure 2:
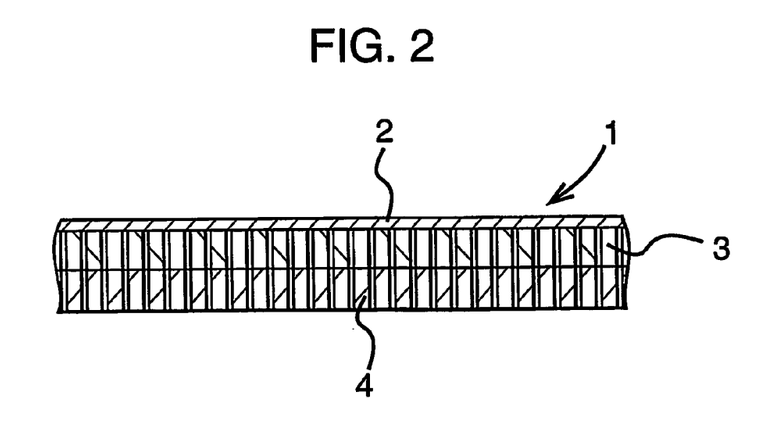
FIG. 2 shows a breathable film (1) having an unperforated polyester layer (2), a perforated substrate layer (3) and a perforated heat-sealable layer (4).

The invention is further illustrated by the following examples. It will be appreciated that the examples are for illustrative purposes only and are not intended to limit the invention as described above. Modification of detail may be made without departing from the scope of the invention.

EXAMPLES

Comparative Example 1

A commercially available gas permeable oriented polypropylene (OPP; Danisco™ 35PA-180) of thickness 35 μm and having 180 perforations per m$^2$ of diameter 125 μm was analysed for its WVTR in a region having a single perforation and in a non-perforated region. The results are in Table 1.

Comparative Example 2

The analysis of Comparative Example 1 was repeated for Danisco™ 35PA-260 gas permeable film of thickness 35 μm and having 260 perforations per m$^2$ of diameter 250 μm. The results are in Table 1.

TABLE 1

| FILM | FILM REGION | WVTR/g/m$^2$/day |
| --- | --- | --- |
| Comparative Example 1 | non-perforated region | 1.39 |
|  | perforated region | 3.42 |
| Comparative Example 2 | non-perforated region | 1.39 |
|  | perforated region | 6.44 |

The data in table 1 demonstrate that in the area of a perforation, the WVTR of a perforated film is of the same order of magnitude as an unperforated film. In addition, for the two films tested, an increase in the number of perforations of almost 50% coupled with a two-fold increase in perforation diameter, only produces a less than two-fold increase in WVTR. Thus, not only is perforated mono-layer oriented polypropylene film not breathable in terms of water vapour transmission, the perforations provide little effect.

Example 1

A polymer composition comprising polyethylene terephthalate was melt-extruded, cast onto a cooled rotating drum and stretched in the direction of extrusion to approximately 3 times its original dimensions. The film was passed into a stenter oven at a temperature of 100° C. where the film was stretched in the sideways direction to approximately 3 times its original dimensions. The biaxially stretched film was heat-set at a temperature of about 230° C. by conventional means. The total thickness of the final film was 3 μm. The film was a clear film with a haze of 5%. The WVTR of the film was measured as 104 g/m$^2$/day.

A clear biaxially oriented heat-sealable polypropylene film (UCB Films, Wigton, UK) of thickness 20 μm was perforated using the equipment herein described to give 360 perforations per (25 mm)$^2$ having an average diameter of 0.7 μm.

The polyester film was spray melt-coated with EVA adhesive (BAM301, Beardow & Adams Ltd, Milton Keynes, UK) at a coat-weight of 1.5 g/m$^2$ in accordance with the procedure described herein and then laminated to the perforated polypropylene film by passing the two films through a heated nip-roller. The WVTR of the final film was 94 g/m$^2$/day.

Example 2

The procedure of Example 1 was repeated except that the unperforated polyester film was 1.2 μm in thickness. The WVTR of the final laminated film was 240 g/m$^2$/day.

Example 3

The procedure of Example 1 was repeated except that the polypropylene film was replaced with a bi-layer polyester film comprising a substrate layer of clear polyethylene terephthalate and a copolyester heat-sealable layer, prepared as follows:

A polymer composition comprising polyethylene terephthalate was extruded and cast onto a cooled rotating drum and stretched in the direction of extrusion to approximately 3 times its original dimensions. The film was passed into a stenter oven at a temperature of 100° C. where the film was stretched in the sideways direction to approximately 3 times its original dimensions. The biaxially stretched film was heat-set at about 230° C. by conventional means. The heat-set film was then coated off-line using conventional coating means with a copolyester of azeleic acid/terephthalic acid/ethylene glycol (45/55/100) to give a dry coating thickness of 2 μm. The total film thickness was 25 μm.

The WVTR of the final laminated film was 78 g/m$^2$/day.

Example 4

The procedure of Example 1 was repeated except that the polypropylene film was replaced with a bi-layer polyester film comprising a substrate layer of clear polyethylene terephthalate and a copolyester heat-sealable layer, prepared as follows:

A polymer composition comprising polyethylene terephthalate was co-extruded with a copolyester comprising terephthalic acid/isophthalic acid/ethylene glycol (82/18/100), cast onto a cooled rotating drum and stretched in the direction of extrusion to approximately 3 times its original dimensions. The film was passed into a stenter oven at a temperature of 100° C. where the film was stretched in the sideways direction to approximately 3 times its original dimensions. The biaxially-stretched film was heat-set at a temperature of about 230° C. by conventional means. The total thickness of the final film was 23 μm; the heat sealable layer was approximately 4 μm thick.

Example 5

A 23 μm polyester film (Mylar® 800) was perforated as described in Example 1, and then extrusion coated using conventional extrusion coating equipment with a 9 μm layer of a copolyesterether elastomer (Arnitel® EM 400, DSM, UK), to provide a heat-sealable film having a WVTR of 130 g/m²/day. This film was made into A4 size bags (21 cm×30 cm) into which approximately 150 μm of fresh broccoli was placed. The bags were then sealed in air and placed in a refrigerator for 5 days at 3° C. As a control, similar size bags were made using unperforated, monolayer 25 μm OPP film (UCB, Wigton UK). After 5 days the bags were removed from the fridge and a septum was glued to the sealed bag to allow the analysis of the volatiles within the bags. A 200 ml sample of gas was removed by a syringe and analysed by a Perkin Elmer Automatic Thermal desorber. The volatiles detected, and their abundance, are given in Table 2. Where a volatile was present at too low a level to produce a mass spectrum but at a level were its presence could be detected by the nose, the volatile was recorded as "trace".

TABLE 2

| Volatile | Assessment of Odour | OPP bag-abundance · $10^6$ | Mylar bag-abundance · $10^6$ |
|---|---|---|---|
| Sulphur dioxide | Acidic, unpleasent | 1.7 | None detected |
| Acetaldehyde | Sweet aldehyde | 5 | Trace |
| Methanethiol | Very strong natural gas | 8.6 | None Detected |
| Ethanol | | 12 | None detected |
| Dimethyl sulphide | | 2.4 | Trace |
| Dimethyl disulphide | Strong acidic hint of natural gas | 23.4 | 1.26 |
| Dimethyl trisulphide | | Trace | None Detected |
| Methyl methylthio-methyldisulphide | | Trace | None Detected |
| Ethyl Acetate | | 1.4 | None Detected |
| Acetic acid | | Trace | None Detected |
| Pent-1-ene | | None-Detected | Trace |
| Air | | 1.6 | 1.16 |

The results clearly show that a film according to the present invention is superior to conventional plastics materials in that not only are less organic volatiles produced, but where they are produced they are present at much lower levels. While the inventors do not wish to bound by theory, it is believed that the water permeable film structure of the present invention allows the volatile produced, such as decomposition products, to be flushed out of the bag alongside the transpired water, which acts as a carrier or as a solvent. Previous studies have required inclusion of molecular sieves or adsorbents to achieve this result.

The invention claimed is:

1. A breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
   (i) the thickness of the unperforated barrier layer is no more than 8 μm; and
   (ii) the perforated substrate layer has a degree of perforation of from about 0.1 to about 78%, wherein the perforations have an average diameter of between 0.05 and 1.5 mm;
   the composite film having a WVTR of at least 60 g/m²/day.

2. The film according to claim 1, wherein the unperforated barrier layer is permeable to oxygen.

3. The film according to claim 1, wherein the unperforated barrier layer comprises a polyester comprising terephthalic acid and ethylene glycol.

4. The film according to claim 1, wherein the perforations have an average diameter of between 0.1 and 1.5 mm.

5. The film according to claim 1, wherein the unperforated barrier layer is disposed on the first surface of the substrate.

6. The film according to claim 1, wherein the thickness of the unperforated barrier layer is no more than 5 μm.

7. The film according to claim 1, wherein the perforated substrate layer has between 25 and 400 perforations per (25 mm)².

8. The film according to claim 1, wherein the average perforation diameter is 0.3 to 1.0 mm.

9. The film according to claim 1, wherein the degree of perforation is from about 10 to about 50%.

10. The film according to claim 1, wherein the substrate layer is a copolyesterether.

11. The film according to claim 1, wherein the substrate layer comprises polyester.

12. The film according to claim 11, wherein the substrate layer comprises polyethylene terephthalate.

13. The film according to claim 1, wherein the substrate layer is a heat-sealable layer.

14. The film according to claim 1, wherein there is disposed on the second surface of the substrate layer a perforated heat-sealable layer.

15. The film according to claim 14, wherein the heat-sealable layer is a copolyester derived from ethylene glycol, terephthalic acid and isophthalic acid.

16. The film according to claim 14, wherein the heat-sealable layer is a copolyester derived from terephthalic acid, ethylene glycol and 1,4-cyclohexanedimethanol.

17. The film according to claim 14, wherein the heat-sealable layer is a copolyester derived from an aromatic dicarboxylic acid, an aliphatic dicarboxylic acid and a stoichiometric amount of one or more glycols, wherein the concentration of said aromatic dicarboxylic acid in the copolyester is in the range from 50 to 55 mole % based on all the dicarboxylic acid components of the copolyester, and the concentration of said aliphatic dicarboxylic acid in the copolyester is in the range from 45 to 50 mole % based on all the dicarboxylic acid components of the copolyester.

18. The film according to claim 17, wherein said aromatic dicarboxylic acid is terephthalic acid, wherein said aliphatic dicarboxylic acids are selected from sebacic acid, adipic acid and azelaic acid, and wherein the glycol component is ethylene or butylene glycol.

19. The film according to claim 1, wherein the film exhibits a haze of less than 6%.

20. The film according to claim 1, wherein the film exhibits a total light transmission of at least 80%.

21. The film according to claim 15, wherein the molar ratio of the terephthalic acid component to the isophthalic acid component is in the range from 65:35 to 85:15.

22. The film according to claim 15, wherein the molar ratio of the terephthalic acid component to the isophthalic acid component is 82:18.

23. The film according to claim 16, wherein the molar ratio of 1,4-cyclohexanedimethanol to ethylene glycol is in the range from 30:70 to 35:65.

24. The film according to claim 16, wherein the molar ratio of 1,4-cyclohexanedimethanol to ethylene glycol is 33:67.

25. The film according to claim 1, wherein the film is optically clear.

26. The film according to claim 1, wherein material from the unperforated barrier layer does not fill the perforations in the perforated substrate layer to more than 50% by volume of the perforations.

27. The film according to claim 1, consisting of the perforated polymeric substrate layer, the unperforated barrier layer and optionally a perforated heat-sealable layer disposed on the second surface of the substrate layer; wherein the perforated heat-sealable layer is a copolyester derived from ethylene glycol, terephthalic acid and
   a) isophthalic acid;
   b) 1,4-cyclohexanedimethanol; or
   c) an aliphatic dicarboxylic acid.

28. A process for producing a breathable, heat-sealable composite film comprising:
   (a) providing a polymeric substrate layer having a first and second surface and optionally a discrete heat-sealable layer disposed on the second surface of the substrate layer;
   (b) perforating said substrate layer and if present said discrete heat-sealable layer; and
   (c) providing on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein
   (i) the thickness of the unperforated layer is no more than 8 μm; and
   (ii) the perforated substrate layer has a degree of perforation of from about 0.1 to about 78%, wherein the perforations have an average diameter of between 0.05 and 1.5 mm;
   the composite film having a WVTR of at least 60 g/m$^2$/day.

29. The process according to claim 28, wherein the unperforated barrier layer of the film is permeable to oxygen.

30. The process according to claim 28, wherein the unperforated barrier layer is laminated to the perforated substrate layer.

31. The process according to claim 30, wherein an adhesive composition is applied by spray melt-coating onto one or both of the unperforated barrier layer or the first surface of the substrate layer.

32. The process according to claim 31, wherein the adhesive composition comprises ethylene vinyl alcohol.

33. The process according to claim 28, wherein the unperforated barrier layer is provided on the substrate layer by extrusion coating.

34. The process according to claim 28, wherein the unperforated barrier layer comprises a polyester wherein the polyester comprises terephthalic acid and ethylene glycol.

35. The process according to claim 28, wherein the substrate layer is a copolyesterether.

36. The process according to claim 28, wherein the substrate layer comprises polyester.

37. A sealed container comprising a receptacle containing cut plant(s), and a lid formed from a polymeric film wherein said film is a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
   (i) the thickness of the unperforated barrier layer is no more than 8 μm; and
   (ii) the perforated substrate layer has a degree of perforation of from about 0.1 to about 78%, wherein the perforations have an average diameter of between 0.05 and 1.5 mm;
   the composite film having a WVTR of at least 60 g/m$^2$/day.

38. A method of packaging cut plants wherein said method comprises the step of providing a breathable film as at least part of the packaging wherein said breathable film is a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
   (i) the thickness of the unperforated barrier layer is no more than 8 μm;
   (ii) the perforated substrate layer has a degree of perforation of from about 0.1 to about 78%, wherein the perforations have an average diameter of between 0.05 and 1.5 mm;
   and further comprising the step of packaging said plants in said film;
   the composite film having a WVTR of at least 60 g/m$^2$/day.

39. A method of packaging cut plants wherein said method comprises the step of placing said plants in a receptacle comprising a lid wherein said lid is a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
   (i) the thickness of the unperforated barrier layer is no more than 8 μm;
   (ii) the perforated substrate layer has a degree of perforation of from about 0.1 to about 78%, wherein the perforations have an average diameter of between 0.05 and 1.5 mm;
   and further comprising the step of packaging said plants in said film;
   the composite film having a WVTR of at least 60 g/m$^2$/day.

40. A package for an ovenable meal comprising a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
   (i) the thickness of the unperforated barrier layer is no more than 8 μm; and
   (ii) the perforated substrate layer has a degree of perforation of from about 0.1 to about 78%, wherein the perforations have an average diameter of between 0.05 and 1.5 mm;
   the composite film having a WVTR of at least 60 g/m$^2$/day.

41. The ovenable meal package according to claim 40, wherein said package further comprises a receptacle and a lid and wherein said lid is formed by said breathable film.

42. A breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
(i) the thickness of the unperforated barrier layer is no more than 12 μm; and
(ii) the perforated substrate layer has a degree of perforation of from about 0.1 to about 78%, wherein the perforations have an average diameter of between 0.05 and 1.5 mm;
the composite film having a WVTR of at least 60 g/m$^2$/day;
wherein the perforated substrate layer has between 25 and 400 perforations per $(25 \text{ mm})^2$.

43. The film according to claim 42, wherein the unperforated barrier layer is permeable to oxygen.

44. The film according to claim 42, wherein the unperforated barrier layer comprises a polyester comprising terephthalic acid and ethylene glycol.

45. The film according to claim 42, wherein the perforations have an average diameter of between 0.1 and 1.5 mm.

46. The film according to claim 42, wherein the unperforated barrier layer is disposed on the first surface of the substrate.

47. The film according to claim 42, wherein the thickness of the unperforated barrier layer is no more than 5 μm.

48. The film according to claim 42, wherein the average perforation diameter is 0.3 to 1.0 mm.

49. The film according to claim 42, wherein the degree of perforation is from about 10 to about 50%.

50. The film according to claim 42, wherein the substrate layer is a copolyesterether.

51. The film according to claim 42, wherein the substrate layer comprises polyester.

52. The film according to claim 51, wherein the substrate layer comprises polyethylene terephthalate.

53. The film according to claim 42, wherein the substrate layer is a heat-sealable layer.

54. The film according to claim 42, wherein there is disposed on the second surface of the substrate layer a perforated heat-sealable layer.

55. The film according to claim 54, wherein the heat-sealable layer is a copolyester derived from ethylene glycol, terephthalic acid and isophthalic acid.

56. The film according to claim 54, wherein the heat-sealable layer is a copolyester derived from terephthalic acid, ethylene glycol and 1,4-cyclohexanedimethanol.

57. The film according to claim 54, wherein the heat-sealable layer is a copolyester derived from an aromatic dicarboxylic acid, an aliphatic dicarboxylic acid and a stoichiometric amount of one or more glycols, wherein the concentration of said aromatic dicarboxylic acid in the copolyester is in the range from 50 to 55 mole % based on all the dicarboxylic acid components of the copolyester, and the concentration of said aliphatic dicarboxylic acid in the copolyester is in the range from 45 to 50 mole % based on all the dicarboxylic acid components of the copolyester.

58. The film according to claim 57, wherein said aromatic dicarboxylic acid is terephthalic acid, wherein said aliphatic dicarboxylic acids are selected from sebacic acid, adipic acid and azelaic acid, and wherein the glycol component is ethylene or butylene glycol.

59. The film according to claim 42, wherein the film exhibits a haze of less than 6%.

60. The film according to claim 42, wherein the film exhibits a total light transmission of at least 80%.

61. The film according to claim 55, wherein the molar ratio of the terephthalic acid component to the isophthalic acid component is in the range from 65:35 to 85:15.

62. The film according to claim 55, wherein the molar ratio of the terephthalic acid component to the isophthalic acid component is 82:18.

63. The film according to claim 56, wherein the molar ratio of 1,4-cyclohexanedimethanol to ethylene glycol is in the range from 30:70 to 35:65.

64. The film according to claim 56, wherein the molar ratio of 1,4-cyclohexanedimethanol to ethylene glycol is 33:67.

65. The film according to claim 42, wherein the film is optically clear.

66. The film according to claim 42, wherein material from the unperforated barrier layer does not fill the perforations in the perforated substrate layer to more than 50% by volume of the perforations.

67. The film according to claim 42, consisting of the perforated polymeric substrate layer, the unperforated barrier layer and optionally a perforated heat-sealable layer disposed on the second surface of the substrate layer;
wherein the perforated heat-sealable layer is a copolyester derived from ethylene glycol, terephthalic acid and
a) isophthalic acid;
b) 1,4-cyclohexanedimethanol; or
c) an aliphatic dicarboxylic acid.

68. A process for producing a breathable, heat-sealable composite film comprising:
(a) providing a polymeric substrate layer having a first and second surface and optionally a discrete heat-sealable layer disposed on the second surface of the substrate layer;
(b) perforating said substrate layer and if present said discrete heat-sealable layer; and
(c) providing on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein
(i) the thickness of the unperforated layer is no more than 12 μm; and
(ii) the perforated substrate layer has a degree of perforation of from about 0.1 to about 78%, wherein the perforations have an average diameter of between 0.05 and 1.5 mm;
the composite film having a WVTR of at least 60 g/m$^2$/day;
wherein the perforated substrate layer has between 25 and 400 perforations per $(25 \text{ mm})^2$.

69. The process according to claim 68, wherein the unperforated barrier layer of the film is permeable to oxygen.

70. The process according to claim 68, wherein the unperforated barrier layer is laminated to the perforated substrate layer.

71. The process according to claim 70, wherein an adhesive composition is applied by spray melt-coating onto one or both of the unperforated barrier layer or the first surface of the substrate layer.

72. The process according to claim 71, wherein the adhesive composition comprises ethylene vinyl alcohol.

73. The process according to claim 68, wherein the unperforated barrier layer is provided on the substrate layer by extrusion coating.

74. The process according to claim 68, wherein the thickness of the unperforated barrier layer is no more than 8 μm.

75. The process according to claim 68, wherein the unperforated barrier layer comprises a polyester wherein the polyester comprises terephthalic acid and ethylene glycol.

76. The process according to claim 68, wherein the substrate layer is a copolyesterether.

77. The process according to claim 68, wherein the substrate layer comprises polyester.

78. A sealed container comprising a receptacle containing cut plant(s), and a lid formed from a polymeric film wherein said film is a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
  (i) the thickness of the unperforated barrier layer is no more than 12 μm; and
  (ii) the perforated substrate layer has a degree of perforation of from about 0.1 to about 78%, wherein the perforations have an average diameter of between 0.05 and 1.5 mm;
  the composite film having a WVTR of at least 60 g/m$^2$/day;
  wherein the perforated substrate layer has between 25 and 400 perforations per (25 mm)$^2$.

79. The sealed container of claim 78, wherein the thickness of the unperforated barrier layer is no more than 8 μm.

80. A method of packaging cut plants wherein said method comprises the step of providing a breathable film as at least part of the packaging wherein said breathable film is a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
  (i) the thickness of the unperforated barrier layer is no more than 12 μm;
  (ii) the perforated substrate layer has a degree of perforation of from about 0.1 to about 78%, wherein the perforations have an average diameter of between 0.05 and 1.5 mm;
  and further comprising the step of packaging said plants in said film;
  the composite film having a WVTR of at least 60 g/m$^2$/day;
  wherein the perforated substrate layer has between 25 and 400 perforations per (25 mm)$^2$.

81. The method of claim 80, wherein the thickness of the unperforated barrier layer is no more than 8 μm.

82. A method of packaging cut plants wherein said method comprises the step of placing said plants in a receptacle comprising a lid wherein said lid is a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
  (i) the thickness of the unperforated barrier layer is no more than 12 μm;
  (ii) the perforated substrate layer has a degree of perforation of from about 0.1 to about 78%, wherein the perforations have an average diameter of between 0.05 and 1.5 mm;
  and further comprising the step of packaging said plants in said film;
  the composite film having a WVTR of at least 60 g/m$^2$/day;
  wherein the perforated substrate layer has between 25 and 400 perforations per (25 mm)$^2$.

83. The method of claim 82, wherein the thickness of the unperforated barrier layer is no more than 8 μm.

84. A package for an ovenable meal comprising a breathable, heat-sealable, composite film comprising a perforated polymeric substrate layer having a first and second surface and disposed on a surface of the substrate layer an unperforated barrier layer that is permeable to gaseous water and that comprises a polymer selected from the group consisting of copolyesterethers, polyesters comprising terephthalic acid and ethylene glycol, and polyamides, wherein:
  (i) the thickness of the unperforated barrier layer is no more than 12 μm; and
  (ii) the perforated substrate layer has a degree of perforation of from about 0.1 to about 78%, wherein the perforations have an average diameter of between 0.05 and 1.5 mm;
  the composite film having a WVTR of at least 60 g/m$^2$/day;
  wherein the perforated substrate layer has between 25 and 400 perforations per (25 mm)$^2$.

85. The package of claim 84, wherein the thickness of the unperforated barrier layer is no more than 8 μm.

86. The package of claim 84, wherein said package further comprises a receptacle and a lid and wherein said lid is formed by said breathable film.

* * * * *

UNITED STATES PATENT AND TRADEMARK OFFICE
CERTIFICATE OF CORRECTION

PATENT NO. : 8,586,159 B2  
APPLICATION NO. : 10/564593  
DATED : November 19, 2013  
INVENTOR(S) : Sankey et al.

Page 1 of 1

It is certified that error appears in the above-identified patent and that said Letters Patent is hereby corrected as shown below:

On Title Page 2, Item [56], References Cited, OTHER PUBLICATIONS:
JP07041043A "London, GB; AN 1995-118516" should read -- London, GB; CLASS A92, AN 1995118516 --

Signed and Sealed this
Twenty-seventh Day of May, 2014

Michelle K. Lee
*Deputy Director of the United States Patent and Trademark Office*